United States Patent [19]

Nishiki et al.

[11] Patent Number: 5,180,502
[45] Date of Patent: Jan. 19, 1993

[54] ELECTROLYTIC OZONIZER AND METHOD OF DECOMPOSING OZONE-CONTAINING WASTE GAS USING SAID OZONIZER

[75] Inventors: Yoshinori Nishiki; Isao Sawamoto; Shuji Nakamatsu, all of Kanagawa; Takayuki Shimamune, Tokyo, all of Japan

[73] Assignee: Permelec Electrode Ltd., Kanagawa, Japan

[21] Appl. No.: 701,014

[22] Filed: May 13, 1991

Related U.S. Application Data

[63] Continuation of Ser. No. 349,673, May 10, 1989, abandoned.

[30] Foreign Application Priority Data

May 11, 1988 [JP] Japan .................. 63-114388

[51] Int. Cl.$^5$ ................................. C02F 1/78
[52] U.S. Cl. ........................ 210/748; 210/192; 210/760; 422/173; 422/177; 423/219
[58] Field of Search ............. 423/58, 219; 204/129; 422/5, 28, 173, 177; 210/638, 669, 748, 760, 764, 192

[56] References Cited

U.S. PATENT DOCUMENTS 4,836,929 6/1989 Baumann et al. .............. 210/638

FOREIGN PATENT DOCUMENTS

| 0281940 | 9/1988 | European Pat. Off. |
|---|---|---|
| 49-40290 | 4/1974 | Japan ........... 423/219 |
| 52-45676 | 11/1977 | Japan ........... 423/219 |
| 59-42025 | 3/1982 | Japan ........... 422/173 |

Primary Examiner—Wayne Langel
Attorney, Agent, or Firm—Sughrue, Mion, Zinn, Macpeak & Seas

[57] ABSTRACT

The present invention is directed toward an electrolytic ozonier for treating ozone-containing waste gas and a method of treating ozone-containing waste gas using the ozonier, wherein the method includes evolving oxygen and ozone in an anode compartment of an electrolytic cell by electrolysis of water while evolving hydrogen in a cathode compartment; directing the evolved hydrogen into a waste gas treating section that contains a waste gas decomposition catalyst so as to convert the hydrogen to a harmless form by means of the catalyst; bringing the oxygen and ozone into contact with a medium to be treated in an ozone contactor so as to treat the medium; and subsequently directing waste gas containing oxygen and ozone produced as a result of treatment of the medium into the waste gas treating section where they are brought into either direct or indirect contact with the catalyst so that the ozone in the waste gas is converted into a harmless form.

2 Claims, 2 Drawing Sheets

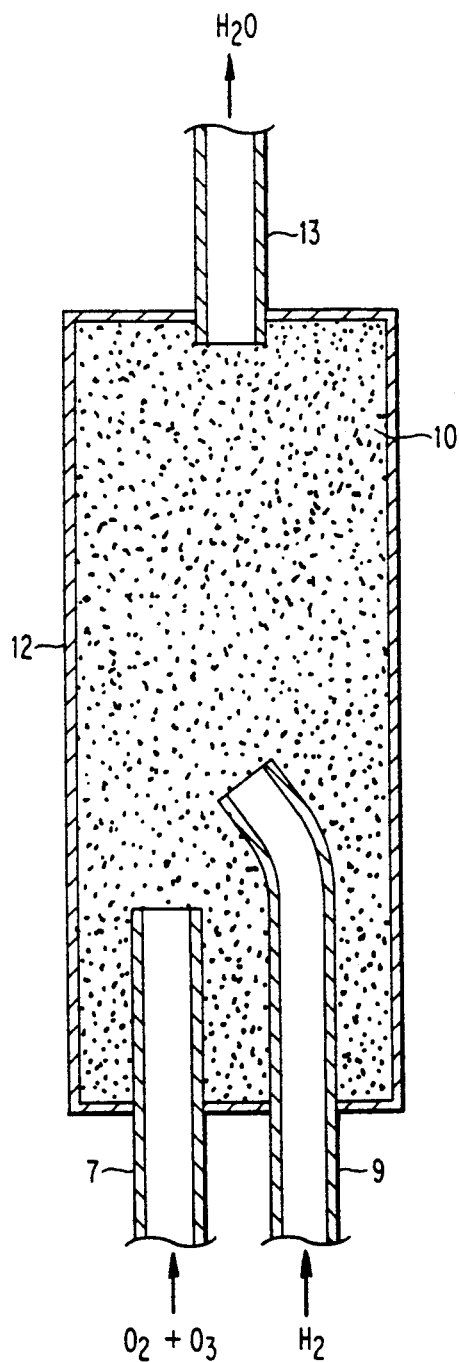
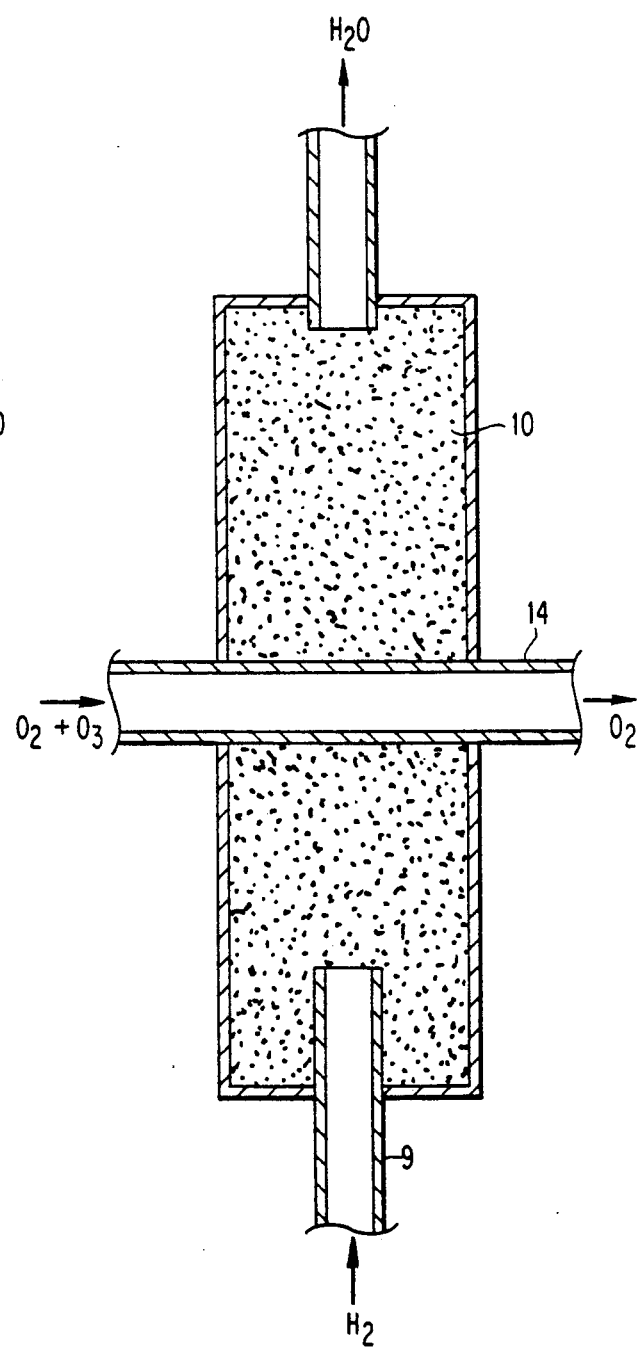

ELECTROLYTIC OZONIZER AND METHOD OF DECOMPOSING OZONE-CONTAINING WASTE GAS USING SAID OZONIZER

This is a continuation of application Ser. No. 07/349,673, filed May 10, 1989, abandoned.

FIELD OF THE INVENTION

The present invention relates to an electrolytic ozonizer for treating ozone-containing waste gas, as well as a method of treating ozone-containing waste gas using said ozonizer.

BACKGROUND OF THE INVENTION

Because of its strong oxidizing power, ozone is extensively used in the treatment of water and air. In particular, ozone is used in the decomposition of organic matter. Commercial methods used today to produce ozone, include the corona discharge of air or oxygen, the electrolysis of water, and the irradiation of air or oxygen with UV light having a specified wavelength.

The corona discharge method was commercialized first since it can be operated with simple equipment and the electric power requirements for production are small. This method is primarily used to disinfect municipal water where large quantities of ozone are needed. However, in order to ensure efficient discharge, the feed gas must be completely dried, and oxygen gas must be used to increase the concentration of the ozone product. The discharge method, therefore, has the drawback that it requires complex facilities to be used in conjunction with the discharge unit. Another problem with the discharge method is that if air is used as the feed gas, noxious gases such NOx will be generated and the fine particulates formed as a result of the consumption of the discharge electrodes will substantially effect the purity of the ozone product.

The irradiation of air or oxygen with ultraviolet rays is incapable of producing ozone in high concentrations.

The electrolytic method uses only pure water as the liquid electrolyte and is capable of producing impurity-free ozone at high concentrations of 10–15% by electrolysis. Since the electric power requirements of this method are several times as large as those of the discharge method, its use is limited to small-scale equipment which can be operated at comparatively low cost or power.

In the methods of ozone generation described above, use of the generated ozone product in the treatment of water or air is generally no more than about 90% efficient. Thus, it is necessary to treat the waste gas containing unused ozone.

In an electrolytic ozone generator as described in U.S. Pat. No. 4,416,747, a gaseous mixture of ozone and oxygen is evolved at the anode while at the same time, hydrogen gas is evolved at the cathode. Therefore, one of the great problems with this type of ozone generator is how to deal with the ozone-containing waste gas and hydrogen gas that remain after the treatment of a medium. Conventionally, the hydrogen gas is converted to water vapor by combustion with the aid of a hydrogen burning catalyst, whereas the ozone-containing waste gas is separately converted to oxygen with the aid of an ozone decomposition catalyst. These catalysts render the waste gases entirely harmless. However, the ozonizer itself is bulky and requires cumbersome operations.

SUMMARY OF THE INVENTION

The present invention solves the aforementioned problems occuring with the use conventional electrolytic methods of ozone generation. Namely, the present invention solves the problems of increased equipment size and complexity of operations due to the need to perform separate treatments on ozone-containing waste gas and hydrogen gas using two different kinds of catalysts.

An object, therefore, of the present invention is to provide an electrolytic ozonizer that is simpler in structure and that is capable of more efficient treatment of waste gases.

Another object of the present invention is to provide a method of treating waste gases using said ozonizer.

The first object of the present invention is attained by an electrolytic ozonizer comprising an electrolytic cell in which oxygen and ozone are evolved in an anode compartment by electrolysis of water, and hydrogen is evolved in a cathode compartment, said anode compartment being connected to a waste gas decomposing section that accommodates a waste gas decomposition catalyst, with a medium treating ozone contactor being interposed between said anode compartment and said waste gas decomposing section, and said cathode compartment being connected to said waste gas decomposing section, with the ozone-containing waste gas which is produced as a result of treatment of said medium in said ozone contactor and said hydrogen gas evolved in the cathode compartment being brought into either direct or indirect contact with said catalyst to be converted to a harmless form.

The second object of the present invention is attained by a method of treating waste gases which comprises: evolving oxygen and ozone in an anode compartment of an electrolytic cell by electrolysis of water while evolving hydrogen in a cathode compartment; directing the evolved hydrogen into a waste gas treating section that accommodates a waste gas decomposition catalyst so as to convert said hydrogen to a harmless form by means of said catalyst; bringing said oxygen and ozone into contact with a medium to be treated in an ozone contactor so as to treat said medium; and subsequently directing waste gas containing oxygen and ozone produed as a result of treatement of said medium into said waste gas treating section where they are brought into either direct or indirect contact with said catalyst so that the ozone in said waste gas is converted to harmless form.

BRIEF DESCRIPTION OF THE DRAWINGS

FIG. 2 is a longitudinal section showing an example of the waste gas treating section of the electrolytic ozonizer of the present invention; and FIG. 3 is a longitudinal section showing another example of the waste gas treating section.

DETAILED DESCRIPTION OF THE INVENTION

Figure 1:
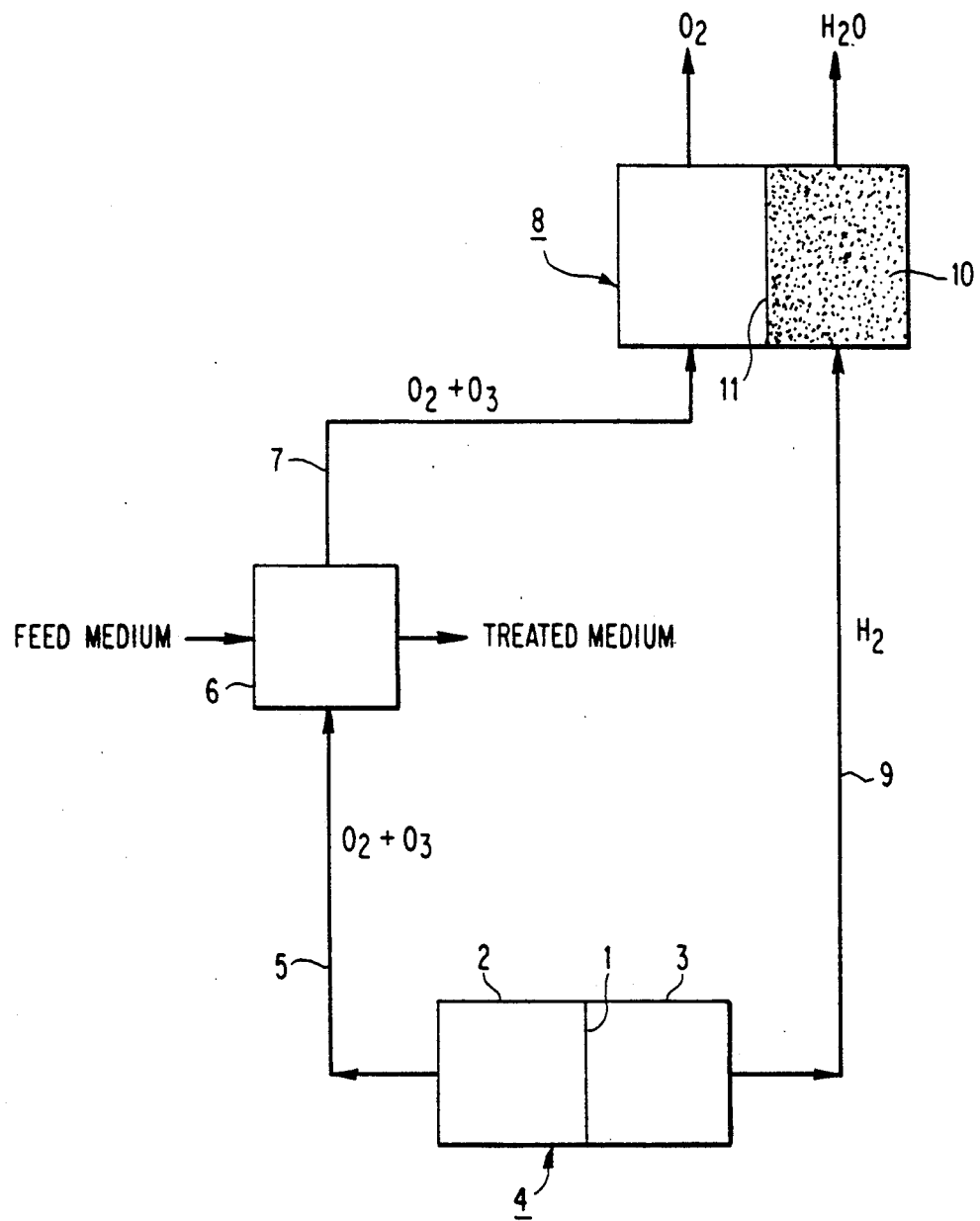
FIG. 1 is a flowchart showing the outline of procedures for treating a medium and ozone-containing waste gas by the method of the present invention.

In their efforts to solve the problems of conventional electrolytic methods of ozone generation, the present inventors noted the fact that the heat of conversion (combustion or oxidation) of hydrogen gas evolved in the cathode compartment of an electrolytic ozonizer can be effectively used to decompose ozone. The principles of the method and apparatus of the present invention are based on this fact and are characterized in that a waste gas which contains ozone generated by electrolysis and which results from the treatment of a medium is treated simultaneously with hydrogen gas, also generated by electrolysis, without the use of two different kinds of catalysts or two types of gas converting apparatuses.

Hydrogen gas evolved in the cathode compartment of an electrolytic ozonizer can explode in a closed space if it is immediately released into an air atmosphere. Therefore, it is converted to non-hazardous water by conversion with a catalyst. This reaction is expressed by $H_2 + 1/2O_2 \rightarrow H_2O$ and generates heat of as much as 68.3 kcal. The temperature of combustion, which varies with the type of catalyst used or the amount of hydrogen evolved, will reach 200°-500° C. under normal conditions of burning (i.e., hydrogen is supplied into 50 ml of catalyst at a flow rate of 5 ml/sec.) If the ozone-containing waste gas is heated at this temperature, ozone will be decomposed in a few seconds to be converted to oxygen ($2O_3 \rightarrow 3O_2$). If, alternatively, the ozone-containing waste gas is supplied into the hydrogen gas, the ozone in the waste gas reacts with hydrogen to be converted to water. These principles are used in the preset invention, in which ozone-containing waste gas is directed into a hydrogen gas conversion catalyst itself or to its neighborhood, so that the ozone in the waste gas is either decomposed by the heat of conversion (combustion) of hydrogen gas or reacted with the hydrogen gas to be converted to water.

The outline of the procedures for treating a medium and ozone-containing waste gas are shown in flowchart in FIG. 1. The basic operation of the method and apparatus of the present invention are described hereinafter with reference to FIG. 1.

When water is electrolyzed in an electrolytic cell 4 consisting of an anode compartment 2 and a cathode compartment 3 separated by a diaphragm 1, a gaseous mixture of ozone and oxygen is evolved in the anode compartment 2 whereas hydrogen gas evolved in the cathode compartment 3. The mixture of ozone and oxygen gases flows through a conduit 5 into an ozone contactor 6 where it makes contact with a medium to be treated such as municipal water. The waste gas having a reduced ozone concentration flows through a conduit 7 into a waste gas decomposing section 8. The hydrogen gas evolved in the cathode compartment 3 flows through a conduit 9 into that portion of the waste gas decomposing section 8 which is filled with a hydrogen conversion catalyst 10. With the aid of the catalyst 10, the hydrogen gas is burnt to be converted to water vapor. The heat of combustion is transmitted through a diaphragm 11 to decompose the ozone in the waste gas, thereby generating oxygen. The structure of the waste gas decomposing section 8 is not limited to the one shown in FIG. 1 and, as will be described later in this specification, this section may be so designed that the ozone-containing waste gas and the hydrogen gas are mixed to undergo direct reaction with each other.

The electrolytic cell 4 for ozone generation in the present invention may be of any conventional type, such as a dimensionally stable anode separated from a nickel cathode by a fluorinated ion-exchange membrane, or a solid polymer electrolyte (SPE) composed of a fluorinated ion-exchange membrane coated on both sides with an electrode active material such as a lead dioxide power or a platinum powder.

When water is electrolyzed using the electrolytic cell described above, oxygen gas containing a small amount of ozone is evolved in the anode compartment whereas hydrogen gas is evolved in the cathode compartment. The ozone-containing oxygen gas flows through a suitable conduit into an ozone contactor where it makes contact with a medium to be treated, such as municipal water to be disinfected. The conduit connecting the anode compartment with the ozone contactor is preferably sealed to prevent contamination by foreign matter. The ozone-containing gas, an ozone concentration of which may reach to $10^5$ ppm, is corrosive, so that the conduit is made of a corrosion-resistant material, preferably titanium or glass.

The ozone-containing waste gas resulting from the ozone treatment of the medium contains from about 0.1 to $10^4$ ppm of ozone and is also corrosive, so that it is preferably directed to the waste gas decomposing section through a titanium conduit.

Leakage of the hydrogen gas evolved in the cathode compartment of the electrolytic cell may cause explosion, so that it is preferably directed into the waste gas decomposing section through a sealed conduit.

Nickel, palladium, platinum or various other conventional materials may be used as the hydrogen conversion (combustion) catalyst in the present invention and a suitable catalyst may be selected in accordance with the specific type of equipment and operating conditions. A palladium-based catalyst is preferred since it does not require any special treatment such as heating.

The shape and structure of the waste gas decomposing section are not limited in any particular way as long as one of the following requirements is met: the hydrogen gas introduced makes contact with the hydrogen conversion catalyst in it so that it is converted to water vapor, and the heat generated upon this conversion allows the ozone in the simultaneously introduced ozone-containing waste gas to be nearly completely converted to oxygen gas; or a alternatively, the ozone-containing waste gas introduced makes contact with the hydrogen conversion catalyst and reacts with hydrogen to be converted to water. An example of the waste gas decomposing section is shown in FIG. 2; the hydrogen conversion catalyst 10 is packed in a cylinder 12, into which a pair of conduit 7 and 9 are partly inserted from the bottom, with ozone-containing waste gas being supplied through the conduit 7 and hydrogen gas through the conduit 9. Hydrogen, ozone and oxygen are reacted in the cylinder 12 to form water vapor, which is released into air atmosphere through a discharge pipe 13 extending from the top of the cylinder 12. Instead of being inserted into the cylinder 12, the conduits 7 and 9 may be connected to the bottom of the cylinder in such a way that ozone-containing waste gas will mix with hydrogen gas before they get into the cylinder 12. In this case, in order to avoid the explosion hazard of mixing the two gases, they are desirably mixed in an area that is as close as possible to the cylinder 12.

Another example of the waste gas decomposing section is shown in FIG. 3. The hydrogen conversion catalyst 10 is packed in a cylinder 12, into which a conduit 9 for hydrogen gas is partly inserted from the bottom. A conduit 14 for ozone-containing waste gas penetrates transversely through the middle of the cylinder 12. In this embodiment, ozone-containing waste gas makes indirect contact with the catalyst 10 via the wall of the conduit 14 and the heat generated by combustion of hydrogen gas allows the ozone in the ozone-containing waste gas to be converted to oxygen. The outer surfaces of the conduits that contact the catalyst 10 are preferably clad with copper or a copper alloy. In another example of the waste gas decomposing section, the conduit for ozone-containing waste gas may be wound helically around the portion which is filled with the hydrogen conversion catalyst.

The following examples are provided for the purpose of further illustrating the present invention but are in no way to be taken as limiting.

EXAMPLE 1

An electrolytic cell for an electrolytic ozonizer was fabricated using the following components: an anode current collector in the form of titanium mesh; a cathode current collector in the form of nickel mesh; a solid polymer electrolyte (Nafion 117) coated on one side with a paste prepared by mixing a lead oxide (i.e., an anode catalyst having high ozone generating ability) and an aqueous polytetrafluoroethylene (PTFE) suspension (30J), and on the other side with a paste prepared by mixing a platinum powder (i.e., a cathode catalyst) and an aqueous PTFE suspension (30J), said electrolyte being rolled into sheet form at a pressure of 100 kg/cm$^2$ and at a temperature of 100° C.; and a titanium anode and a SUS 304 cathode, each having an area of 45 cm$^2$. These components were assembled into the electrolytic cell. When ion-exchanged water supplied into the anode compartment was electrolyzed with a current of 45A being applied (density, 100 A/dm$^2$), wet oxygen gas containing 15 wt % ozone was evolved at the anode at a rate of about 9 l/h (equivalent to ozone generation of about 2 g/h). Wet hydrogen gas was evolved at the cathode at a rate of about 19 l/h.

The evolved hydrogen gas was introduced into a cylinder in mesh form (capacity, 30 ml) containing 25 g of a combustion catalyst that had 0.5 wt % palladium supported on 3-mmΦ alumina particles having specific surface areas of 200 to 300 m$^2$/g. The temperature measured at the hydrogen exit of the cylinder was as high as 380° C. whereas the temperature around the cylinder was 200° C.

The gaseous mixture of ozone and oxygen which was evolved in the anode compartment was introduced through a glass filter (0.5 μm) into a tank of municipal water, where tiny bubbles of the mixed gas were brought into contact with the municipal water to form ozonized water. Ninety-five percent of ozone in the mixed gas was absorbed and dissolved in the municipal water whereas 5% of ozone remained in the vapor phase. The concentration of residual ozone was equivalent to 5,000 ppm.

The resulting ozone-containing waste gas was introduced into a copper clad titanium pipe in the catalyst-filled cylinder of the type shown in FIG. 2. The titanium pipe had a diameter of 10 mm, with the copper cladding being 1 mm thick. After contact for 3 seconds, the concentration of ozone at the exit of the cylinder dropped to 0.1 ppm and below.

EXAMPLE 2

Municipal water was ozonized and the resulting ozone-containing waste gas was treated using the same apparatus as what was employed in Example 1 except that the combustion catalyst-filled cylinder was replaced by the type shown in FIG. 3. The concentration of ozone in the effluent waste gas was 0.1 ppm; the temperature in the central portion of the cylinder was 360° C.; and the contact time was 3 seconds.

In the electrolytic ozonizer of the present invention, water is electrolyzed in an electrolytic cell and the gaseous mixture of ozone and oxygen that is evolved in the anode compartment is used to treat a medium such as water. The resulting ozone-containing waste gas as well as the hydrogen gas evolved in the cathode compartment are introduced into a single waste gas decomposing section, where ozone is converted to harmless oxygen and the hydrogen gas to water vapor.

The waste gas decomposing section is filled with nothing but a hydrogen conversion catalyst. However, when water vapor is produced by combustion of hydrogen, a sufficient amount of heat to convert ozone to oxygen is released so that ozone can be rendered harmless in an indirect way without employing any separate ozone decomposing section filled with an ozone decomposition catalyst. If desired, the ozone-containing waste gas and hydrogen gas may be introduced, either simultaneously or in admixture, into the waste gas decomposing section, so that water vapor is produced as a result of reaction between hydrogen, oxygen and ozone. In this method, too, ozone can be rendered harmless without using two kinds of catalyst or decomposing section.

While the invention has been described in detail and with reference to specific embodiments thereof, it will be apparent to one of ordinary skill in the art that various changes and modifications can be made therein without departing from the spirit and scope thereof.

What is claimed is:

1. An electrolytic ozonizer comprising:
    an electrolytic cell in which oxygen and ozone are evolved in an anode compartment by electrolysis of water, and hydrogen is evolved in a cathode compartment, including means for separating the evolved oxygen and ozone gas from the water electrolyte and means for separating the evolved hydrogen gas from the water electrolyte;
    a waste gas decomposing section being connected to said anode compartment of said electrolytic cell and being connected to said cathode compartment, wherein said waste gas decomposing section comprises a hollow member filled with a hydrogen conversion catalyst, said hollow member comprises a conduit for passage of waste gas, and said conduit penetrates said hollow member transversely in such a way that waste gas in the conduit makes indirect contact with said catalyst via the wall of said conduit;
    an ozone contactor for treating a medium with the said oxygen and ozone gas evolved in the anode compartment and separated from the water electrolyte, including means for directing the said oxygen and ozone gas separated from the water electrolyte to the ozone contactor and means for separating ozone-containing waste gas from the medium being treated, said contactor being interposed between said anode compartment and said waste gas decomposing section;
    wherein ozone-containing waste gas which is produced as a result of treatment of a medium in said ozone contactor and said hydrogen gas evolved in said cathode compartment, are converted to a harmless form.

2. A method of treating waste gas comprising the steps of:

evolving oxygen and ozone in an anode compartment of an electrolytic cell by electrolysis of water while evolving hydrogen in a cathode compartment;

separating the evolved oxygen and ozone gas and the evolved hydrogen gas from the water electrolyte of the electrolytic cell;

directing the evolved hydrogen into a waste gas treating section that contains a waste gas decomposition catalyst so as to convert said hydrogen into a harmless form by means of said catalyst;

bringing said oxygen and ozone into contact with a medium to be treated in an ozone contactor so as to treat said medium;

separating waste gas containing oxygen and ozone from the treated medium; and directing waste gas containing oxygen and ozone produced as a result of treatment of said medium into said waste gas treating section where they are brought into indirect contact with said catalyst so as to decompose ozone in said waste gas with heat generated by conversion of said hydrogen to produce oxygen.

* * * * *